US006075511A

United States Patent [19]

Iwasaki et al.

[11] Patent Number: 6,075,511

[45] **Date of Patent: *Jun. 13, 2000**

[54] DRIVE VOLTAGES SWITCHED DEPENDING UPON TEMPERATURE DETECTION OF CHIRAL SMECTIC LIQUID CRYSTAL DISPLAYS

[75] Inventors: Manabu Iwasaki, Yokohama; Kazunori Katakura, Atsugi, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,168

[22] Filed: Feb. 26, 1996

[30] Foreign Application Priority Data

| | | | |
|---|---|---|---|
| Feb. 27, 1995 | [JP] | Japan | 7-061500 |
| Feb. 28, 1995 | [JP] | Japan | 7-063570 |
| Feb. 28, 1995 | [JP] | Japan | 7-063571 |

[51] Int. Cl.[7] ................................ G09G 3/36; G02F 1/13

[52] U.S. Cl. ................................ 345/101; 345/94; 345/97

[58] Field of Search ................................ 345/101, 94–97, 345/89; 359/43, 56; 349/20, 72, 133, 172, 37

[56] References Cited

U.S. PATENT DOCUMENTS

| | | | |
|---|---|---|---|
| 4,367,924 | 1/1983 | Clark et al. | 349/37 |
| 4,923,285 | 5/1990 | Ogino et al. | 345/101 |
| 5,189,536 | 2/1993 | Hanyu et al. | 345/97 |
| 5,267,065 | 11/1993 | Taniguchi et al. | 345/97 |
| 5,276,542 | 1/1994 | Iwayama et al. | 345/101 |
| 5,283,564 | 2/1994 | Katakura et al. | 345/94 X |
| 5,317,437 | 5/1994 | Katakura | 349/144 |
| 5,321,419 | 6/1994 | Katakura et al. | 345/97 |
| 5,438,442 | 8/1995 | Katakura | 349/144 |
| 5,469,281 | 11/1995 | Katakura et al. | 345/89 |
| 5,471,229 | 11/1995 | Okada et al. | 345/89 |
| 5,481,387 | 1/1996 | Hanyu et al. | 349/132 |
| 5,519,411 | 5/1996 | Okada et al. | 345/89 |
| 5,521,727 | 5/1996 | Inaba et al. | 345/89 |
| 5,532,713 | 7/1996 | Okada et al. | 345/97 |
| 5,602,562 | 2/1997 | Onitsuka et al. | 345/101 |
| 5,608,420 | 3/1997 | Okada | 345/89 |

FOREIGN PATENT DOCUMENTS

| | | |
|---|---|---|
| 56-107216 | 8/1981 | Japan . |
| 2281238 | 11/1990 | Japan . |

*Primary Examiner*—Raymond J. Bayerl
*Attorney, Agent, or Firm*—Fitzpatrick,Cella, Harper & Scinto

[57] ABSTRACT

A display apparatus which is not adversely affected by a change in the drive waveform or environmental conditions. The display apparatus include a display device, a temperature detection device for detecting the temperature of the display device, and control means that controls the drive conditions for display device. The control means switches a driving waveform based on data from the temperature detection device. The effective value of a selection pulse is preferable changed simultaneously with the waveform switching. The waveform switching may be performed in during a temperature rise rather then during a temperature fall, and may be forbidden for a prescribed period after a waveform switching. The waveform switching may be also be performed between two types of waveforms including or not including a pause period.

19 Claims, 9 Drawing Sheets

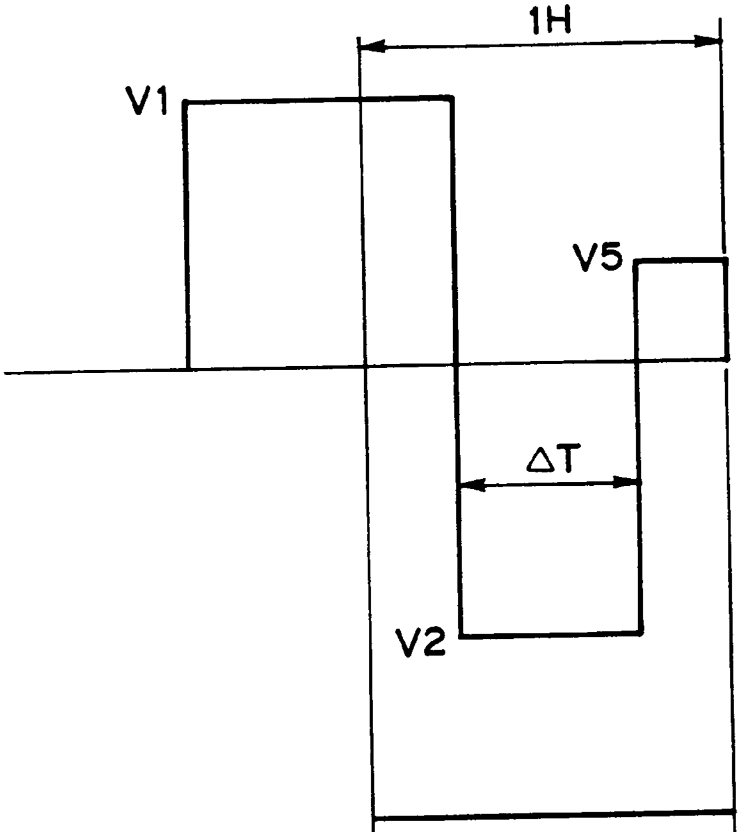
FIG. 3A
PRIOR ART
FIG. 3B
PRIOR ART
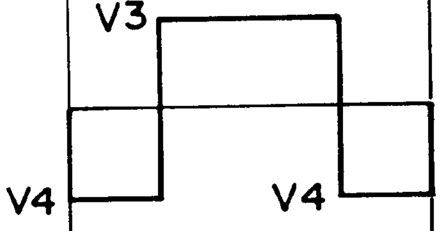
FIG. 3C
PRIOR ART
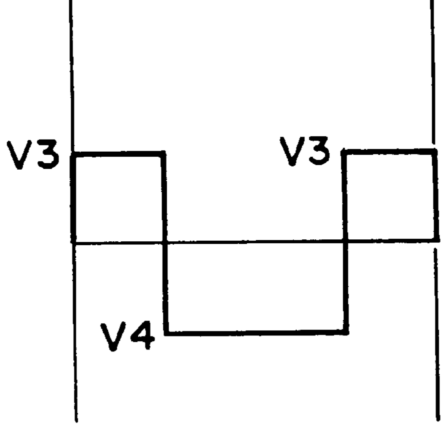
FIG. 3D
PRIOR ART

DRIVE WAVEFORM W1

DRIVE WAVEFORM W2

DRIVE VOLTAGES SWITCHED DEPENDING UPON TEMPERATURE DETECTION OF CHIRAL SMECTIC LIQUID CRYSTAL DISPLAYS

FIELD OF THE INVENTION AND RELATED ART

The present invention relates to a display apparatus for displaying characters, images, etc., for a computer terminal, a video camera recorder, a video projector, a car navigation system, a television receiver, etc.

As a type of display apparatus, there has been well-known a liquid crystal display apparatus including a liquid crystal device which comprises an electrode matrix of scanning electrodes and data electrodes and a liquid crystal disposed so as to form a pixel at each intersection of the electrodes. Among such liquid crystal devices, a ferroelectric liquid crystal device utilizing a bistability of the liquid crystal and showing a fast responsiveness to an applied electric field has been expected as a high-speed and memory-type display device (e.g., as disclosed in Japanese Laid-Open Patent Application (JP-A) 56-107216). Other known types of liquid crystal devices include those using an anti-ferroelectric liquid crystal or a nematic liquid crystal.

Hereinbelow, explanation will be continued with reference to a ferroelectric liquid crystal device, for example. In such a ferroelectric liquid crystal device, ferroelectric liquid crystal molecules are generally aligned to form a layer between a pair of substrates having thereon alignment films of polymers, such as polyimide (PI) or polyamide (PA), having a homogeneous alignment characteristic and rubbed in substantially identical directions. FIG. 1 is a schematic sectional view of such a ferroelectric liquid crystal device for illustrating a model of alignment of liquid crystal molecules. Referring to FIG. 1, the ferroelectric liquid crystal device includes a pair of glass substrates 601 and 607 having thereon transparent electrodes 602 and 606 at ITO (indium tin oxide), etc., and rubbed polymer films having homogeneous alignment powers. Between the substrates, a ferroelectric liquid crystal layer 604 is disposed as represented by molecular alignment states 608, 609 and 610 in a chiral smectic layer. More specifically, each of 608, 609 and 610 represents a succession of director orientations each denoted by a chiral smectic cone represented by a circle and a director as represented by a radially extending bar as viewed from a cone apex. Among these, 608 and 609 represent two stable states in a uniform alignment state, and 601 represents a one of two stable states in a splay alignment state. For convenience, a stable state 608 is denoted by U1 and another stable state 609 is denoted by U2 herein. When the alignment states are viewed from an upper substrate perpendicularly to the substrates, the two stable states U1 and U2 are represented by directors forming inclination angles of $-\theta$ and $+\theta$, respectively, as shown in FIG. 2. In operation, one of polarizers axes P1 and P2 is set to the direction of $+\theta$ (or $-\theta$) in advance, and a voltage (E) is applied across the substrates to orient the liquid crystal molecules to either U1 or U2 state to select a bright or a dark display state.

Accordingly, in order for such a ferroelectric liquid crystal device to exhibit a desired electrooptical performance, it is necessary that the ferroelectric liquid crystal between the substrates is in such an alignment state that it causes a switching between the two stable states, and the alignment state is uniform in each pixel and over an entire display area.

Many proposals have also been made regarding display methods for matrix drive of ferroelectric liquid crystal devices, inclusive of practical display methods as disclosed in U.S. Pat. No. 5,267,065, and JP-A 2-281238.

FIGS. 3A–3D show a known set of drive signal waveforms for a liquid crystal device as disclosed in the above U.S. Pat. No. 5,267,065. Referring to FIG. 3A, shows a scanning selection signal; FIG. 3B a scanning non-selection signal; FIG. 3C, a data signal for displaying "bright"; and FIG. 3D, a data signal for displaying "dark". Herein, "bright" and "dark" are respectively an optical state selectively determined based on a combination of an orientation state of liquid crystal molecules and a polarizing device.

A conventional display device using a ferroelectric liquid crystal is accompanied with a problem that the threshold characteristic for the display device can change after long hours of standing at one stable state of liquid crystal molecules due to an interaction at the boundary between the substrate and the liquid crystal layer. Ferroelectric liquid crystal molecules are liable to be fluctuated by a pulse below the threshold particularly in a low temperature region. In the display method disclosed in U.S. Pat. No. 5,267,065 or JP-A 2-281233, the data signal voltages shown at FIGS. 3C and 3D are incessantly applied so as to provide a high frame frequency. When such pulses having a width of $\Delta T$ are continually applied, in some cases the fluctuation of liquid crystal molecules during a scanning non-selection period is enhanced to cause a local inversion in a display, thus failing to retain a good display.

SUMMARY OF THE INVENTION

In view of the above-mentioned technical problems, a principal object of the present invention is to provide a display apparatus capable of ensuring a sufficient range of drive conditions allowing a good display, and also a high frame frequency allowing a high speed drive.

Another object of the present invention is to provide a display apparatus wherein a display image quality is not adversely affected by a change in drive waveform.

A further object of the present invention is to provide a display apparatus wherein a display image quality is not adversely affected by a change in environmental conditions.

According to the present invention, there is provided a display apparatus, comprising:

a display device, temperature detection means for detecting a temperature of the display device, and control means for controlling drive conditions for the display device depending on temperature data from the temperature detection means, including switching a drive waveform for driving the display device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A–3D are waveform diagrams showing a known set of drive signals used for driving a liquid crystal device.

DESCRIPTION OF THE PREFERRED EMBODIMENTS

Figure 1:
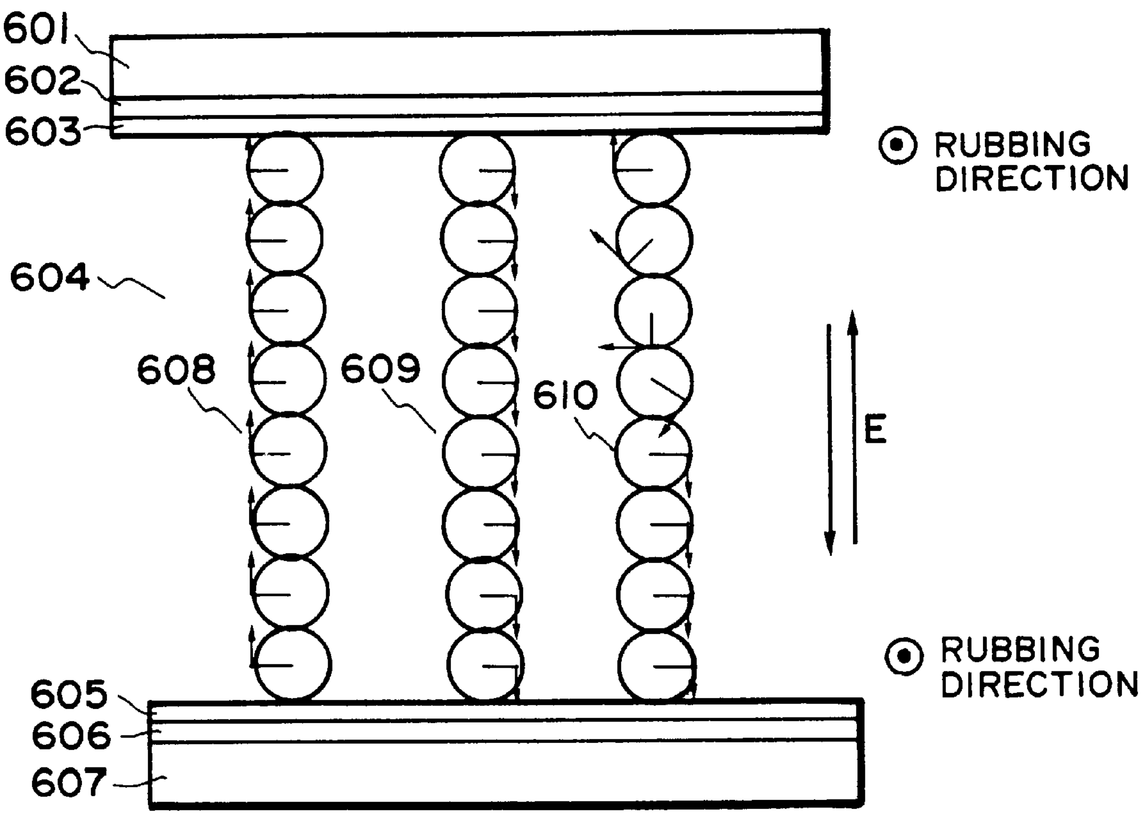
FIG. 1 PRIOR ART
FIG. 1 is a schematic sectional illustration of a liquid crystal device for illustrating alignment models.
Figure 2:
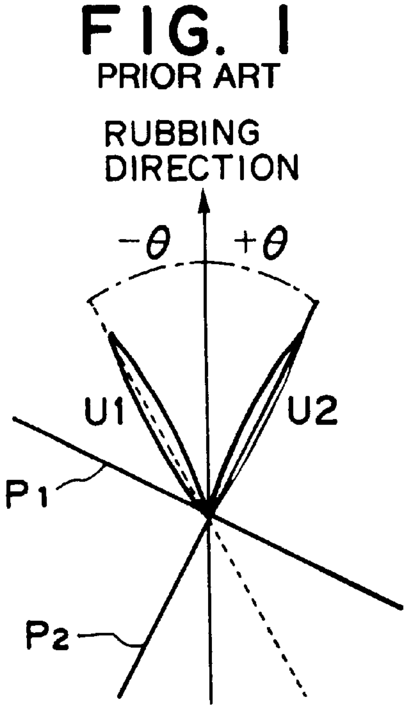
FIG. 2 PRIOR ART
FIG. 2 is an illustration of a relationship between liquid crystal molecular orientations and polarizers.

In a preferred embodiment of the present invention, drive (voltage) waveforms applied to pixels are switched depending on temperature data.

The temperature data may be given as output signals directly or indirectly obtained from a temperature detection device, such as a thermistor attached to the display device, a thermistor disposed in proximity to the display device, or a resistive element or capacitive element having a temperature-dependence integrated within the display device. Accordingly, the temperature dependence of output signals from such temperature detection devices is examined in advance. Then, a relationship between the output signal and display image is examined to store appropriate drive waveforms in relation to the outputs in a memory. As a result, it is possible to derive an appropriate drive waveform from the memory depending on an output from the temperature detection means.

In the case of using a single reference temperature as a reference to switch drive waveforms, it is possible to simply constitute a switching or changeover circuit by using a logic circuit, a changeover switch, etc.

In the present invention, it is preferred to change at least one of a pulse width and a pulse height simultaneously with the waveform switching.

In the present invention, in case where the temperature is increasing or decreasing through the reference temperature, it is preferred not to switch the waveform immediately when the reference temperature is passed but continue the drive based on the waveform before the switching for a prescribed period. It is also preferred to effect the waveform switching at only one of temperature rise and temperature fall immediately after passing through the reference temperature. In this instance, it is preferred to effect the immediate switching only in the case of temperature rise. This is because a once temperature-elevated display device is not liable to remarkably cool because of the heat capacity of an optical modulation material, such as a liquid crystal, and the heat capacity of the substrates of the display device. The control for such a delayed switching may be accomplished by providing the control means with forbidding means for forbidding the waveform switching under a prescribed condition. The forbidding means may for example be given by an AND circuit.

In the case of multiplexing (or matrix) drive, the switching of drive waveform may be performed by changing the waveform of signals supplied to at least one of a scanning line and a data line, whereby a voltage waveform applied to a pixel (formed at an intersection of a scanning line and a data line) in a selection period.

The waveform switching used in the present invention is not a mere change of the pulse width or the pulse height (amplitude) of a unit pulse but refers to a switching between (or among) different types of drive waveforms, e.g., one including a pause period (a period of zero voltage applied to a pixel) and another not including such a pause period, as will be described hereinafter.

The waveforms may be appropriately selected on the optical modulation material used in the display device. The reference temperature may also be appropriately selected depending on the optical modulation material used. In the case of a liquid crystal, the reference temperature may be selected within the range of 5–40° C., preferably 10–20° C.

A preferred combination of drive waveforms used may include a first waveform having a pause period within a selection period and a second waveform having no pause period within a selection period.

The forbidding period for waveform switching may preferably be selected appropriately from a range of 10 sec. to ca. 5 min.

In the case of changing the pulse width or pulse height of a drive voltage pulse for changing display state simultaneously with the waveform switching, the pulse width may be increased and decreased at a lower temperature and a higher temperature, respectively, or the pulse height may be increased and decreased at a lower temperature and a higher temperature, respectively, compared with a reference temperature. Both the pulse width and the pulse height can also be changed. In any case, a specific effective value determined by a combination of a pulse width and a pulse height may preferably be selected so as to suppress a contrast change caused by the waveform switching.

Preferred examples of the display device used in the present invention may include an electrochromic device and a liquid crystal device. Specific examples of the liquid crystal device may include a BTN-liquid crystal device using a chiral nematic liquid crystal showing two quasi-stable states, a ferroelectric liquid crystal device and an anti-ferroelectric liquid crystal device. Unexpectedly remarkable effects of the present invention may be attained when applied to an anti-ferroelectric liquid crystal device or a ferroelectric liquid crystal device using a chiral smectic liquid crystal showing a chevron-shaped smectic layer structure. This is because the waveform switching used in the present invention is effective in enlarging the drive margin which has been restricted due to fluctuation or perturbation of liquid crystal molecules in the chevron layer structure, which is considered to include two molecular alignment states determined by a pretilt angle and a smectic layer inclination angle (U.S. Pat. No. 5,189,536).

Now, such fluctuation of liquid crystal molecules will be described with reference to FIGS. 1 to 4.

Figure 4A:
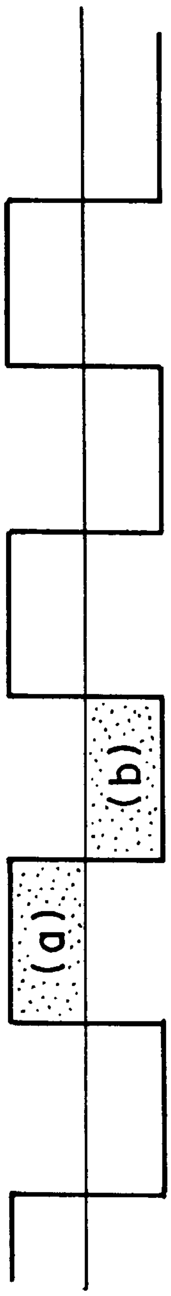
FIGS. 4A–4C each show a succession of data signals providing AC pulses.
Figure 4B:
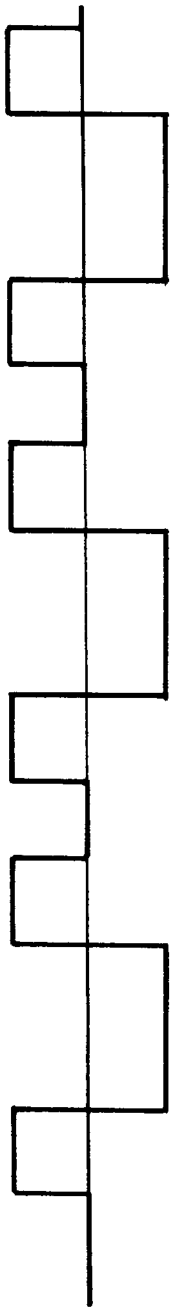
Figure 4C:
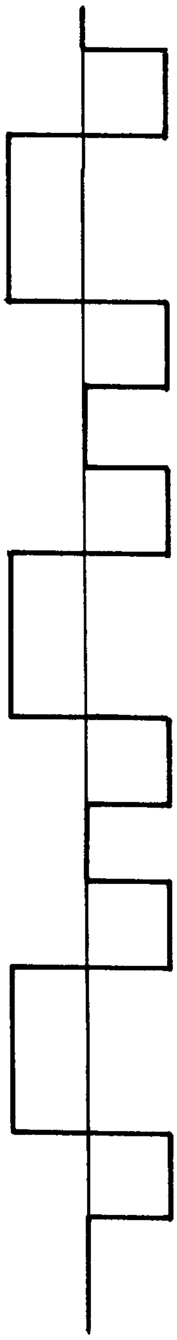

According to our experiments for studying a relationship between AC pulses and liquid crystal molecular fluctuation, it has been found that a different form of AC pulses during the period of non-selection provides a different degree of liquid crystal molecular fluctuation. Referring to FIGS. 4A–4C, the waveform shown in FIG. 4A is an AC waveform for applying a positive pulse (a) and a negative pulse (b) alternately and continuously. The pulses (a) and (b) respectively have a width ΔT which is identical to the width of each of AC pulses applied to a non-selected pixel in the waveform shown in FIGS. 3C and 3D. FIG. 4B shows a waveform obtained by dividing the pulse (a) in FIG. 4A into two equal pulses between which a pause period (i.e., a period of voltage zero) of ΔT/2 is inserted. FIG. 4C shows a waveform obtained by dividing the pulse (b) in FIG. 4A into two equal pulses between which a pause period of ΔT/2 is inserted. All the waveforms shown in FIGS. 4A–4C have an identical effective value (i.e., an identical product of amplitude×pulse width of pulses of one polarity in a period of 1H, i.e., one horizontal scanning period). In our experiments, the degree of liquid crystal molecular fluctuation was changed depending on any of the waveforms shown in FIGS. 4A–4C applied thereto. When two molecular orientation states of a chiral smectic liquid crystal are denoted by U1 (bright) and U2 (dark) for convenience with the proviso that the inversion from U1 to U2 is caused by a negative polarity pulse, it has been found that the liquid crystal in U1 state is fluctuated in a larger degree when supplied with pulse (b) and the liquid crystal in U2 state is fluctuated in a larger degree when supplied with pulse (a).

When a pulse period of ΔT/2 is inserted into a data signal so as to reduce the number of application of the pulse (b) to a pixel in a U1 state during the non-selection period. As a result, the pulse (b) is not applied even if data pulses for bright display (U1 in this case) are applied in succession. In other words, one time of application of pulse (b) is reduced in one frame when one other pixel for displaying U1 state is present on an identical data electrode with the pixel concerned. If two other pixels are present, two times are reduced and, if three other pixels are present, three times are reduced. In an extreme case, when all the pixels on a data electrode noted are to display U1 state, no pulse (b) is applied and each pixel on the data electrode noted is supplied with a succession of data signals as shown in FIG. 4C. In this way, though depending on an image pattern to be displayed, the number of times of application of pulse (b) is reduced considerably than in the conventional method. Similarly, the number of times of application of a pulse component like (a) in FIG. 4A to a pixel in U2 state is substantially reduced. As a result, the fluctuation by which the drive margin is restricted is suppressed to provide a large drive margin.

Figure 5:
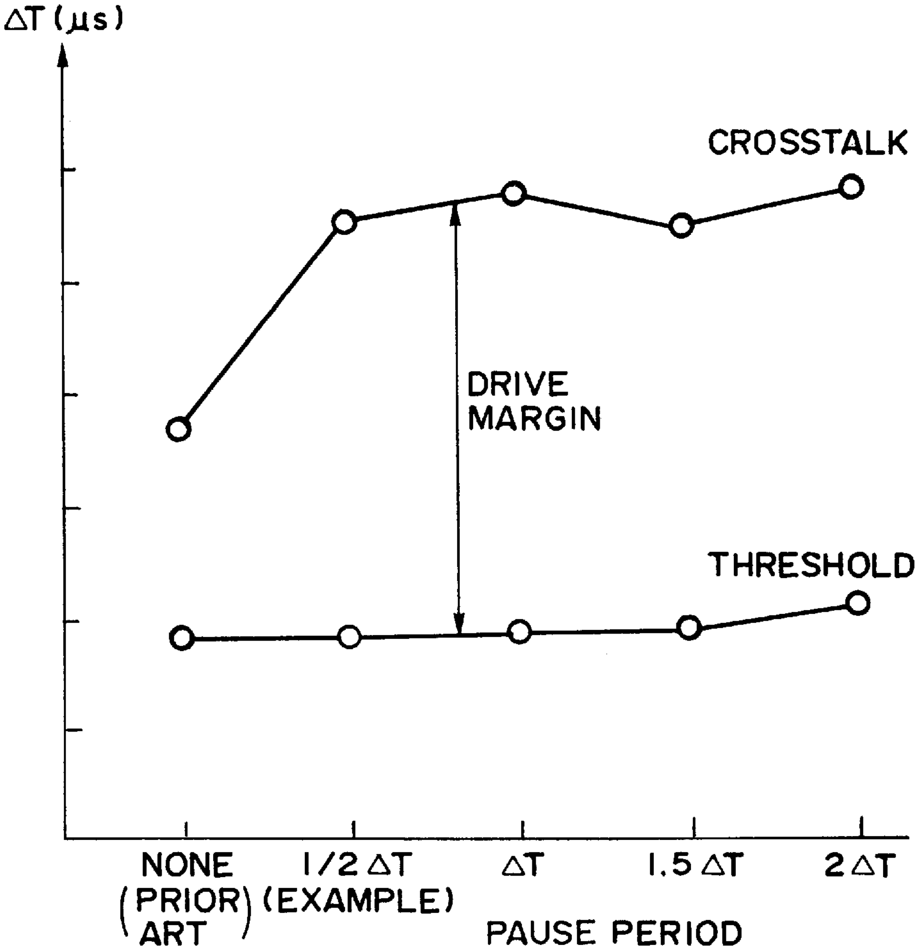
FIG. 5 is a graph showing a relationship between pause period and drive margin.

Further, we have studied a relationship between the pause period and the drive margin by increasing the pause period by an increment of ΔT/2. As a result, it has been found that the magnitude of drive margin is almost saturated around a pause period of ΔT/2 as shown in FIG. 5, which is based on a series of experiments which were conducted at a temperature of 10° C. and voltage signals shown in FIG. 9 were set to have amplitudes V1=14.3 volts, V2=−14.3 volts, V3=5.7 volts, V4=−5.7 volts and V5=6.4 volts to examine a range of ΔT allowing a good display in a display unit (panel) 101 in an Example described hereinafter. In order to provide a high frame frequency, too long a pause period is not desired. The pause period may optimally be ΔT/2 in view of both the drive margin and the drive speed. The pause period can be made shorter than ΔT/2 if desired, but may preferably be set so as to provide a ratio of a simple integer between the pause period and the respective pulses in view of drive circuit designing. This is because a basic clock pulse width in the drive circuit system is set by dividing the one-horizontal scanning period 1H so as to provide the selection pulse V2 and auxiliary pulses V3–V5 with durations which are multiplication with an integer of the pause period and therefor too short a basic clock pulse is required if the ratios among the respective pulse widths are complex. As a result, a circuit having a unnecessarily high response speed can be necessitated to result in an increased production cost. This difficulty can be obviated by setting ratios of a simple integer between the pause period and the respective pulses as mentioned above.

Figure 6:
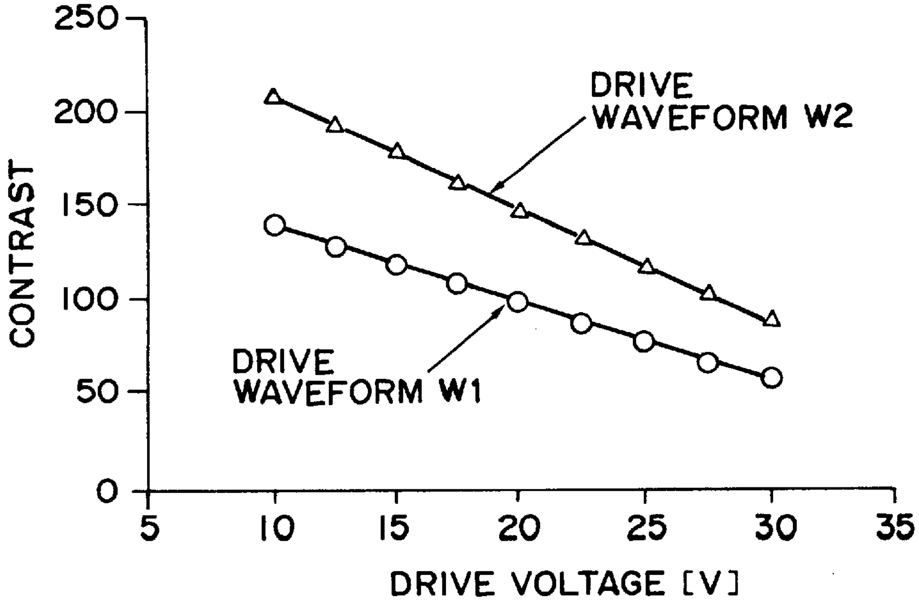
FIG. 6 is a graph showing a relationship between drive voltage and contrast.

The degree of liquid crystal molecular fluctuation varies depending on whether a drive waveform including no pause period (e.g., W1 shown in FIG. 8) or drive waveform including a pause period (e.g., W2 shown in FIG. 9) is applied. As a result, different contrasts are obtained when the waveforms W1 and W2 are applied as shown in FIG. 6. Accordingly, if the waveform switching is performed frequently, the user can recognize the contrast change as a flicker.

For this reason, in a preferred embodiment of the present invention, the contrast change is suppressed to prevent the flicker by changing the effective value of a selection pulse simultaneously with the drive waveform switching.

More specifically, the drive waveform is changed so that the pause period is omitted to provide a higher frame frequency at a higher temperature, a pause period of ΔT/2 is inserted so as to reduce the number of pulses remarkably fluctuating the U1 state and the U2 state to ensure the drive margin at a lower temperature, and the effective value of a selection pulse is changed to prevent a flicker accompanying the waveform switching.

The present invention is effectively applied to not only to a monochromatic display device but also to a multi-color display device by dividing a pixel for a monochromatic device into three or more sub-pixels each provided with a color filter.

The present invention will be described in further detail based on specific embodiments.

[First embodiment]

Figure 7:
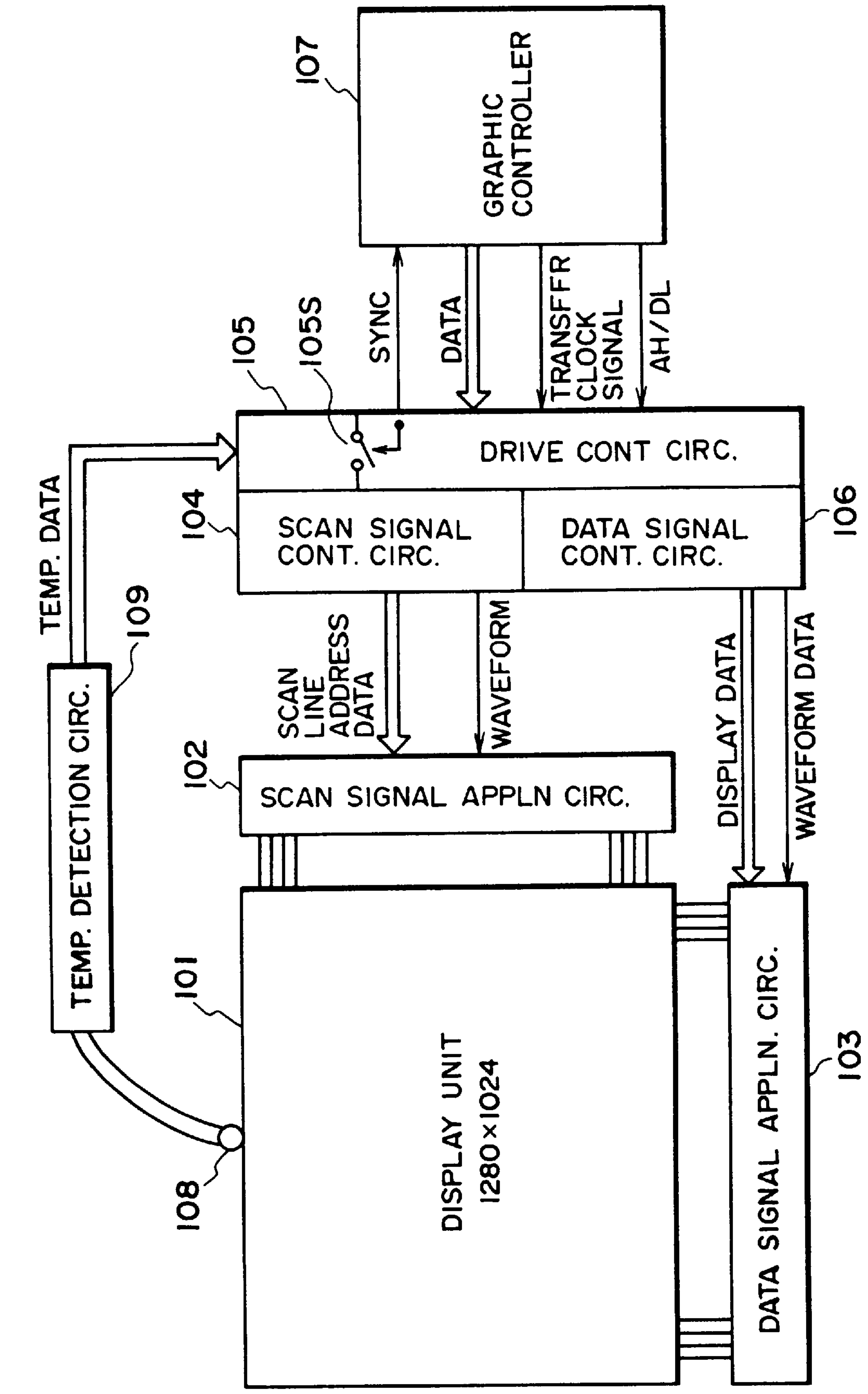
FIG. 7 is a block diagram of a display apparatus according to an embodiment of the invention.
Figures 8A, 8B, 8C, 8D:
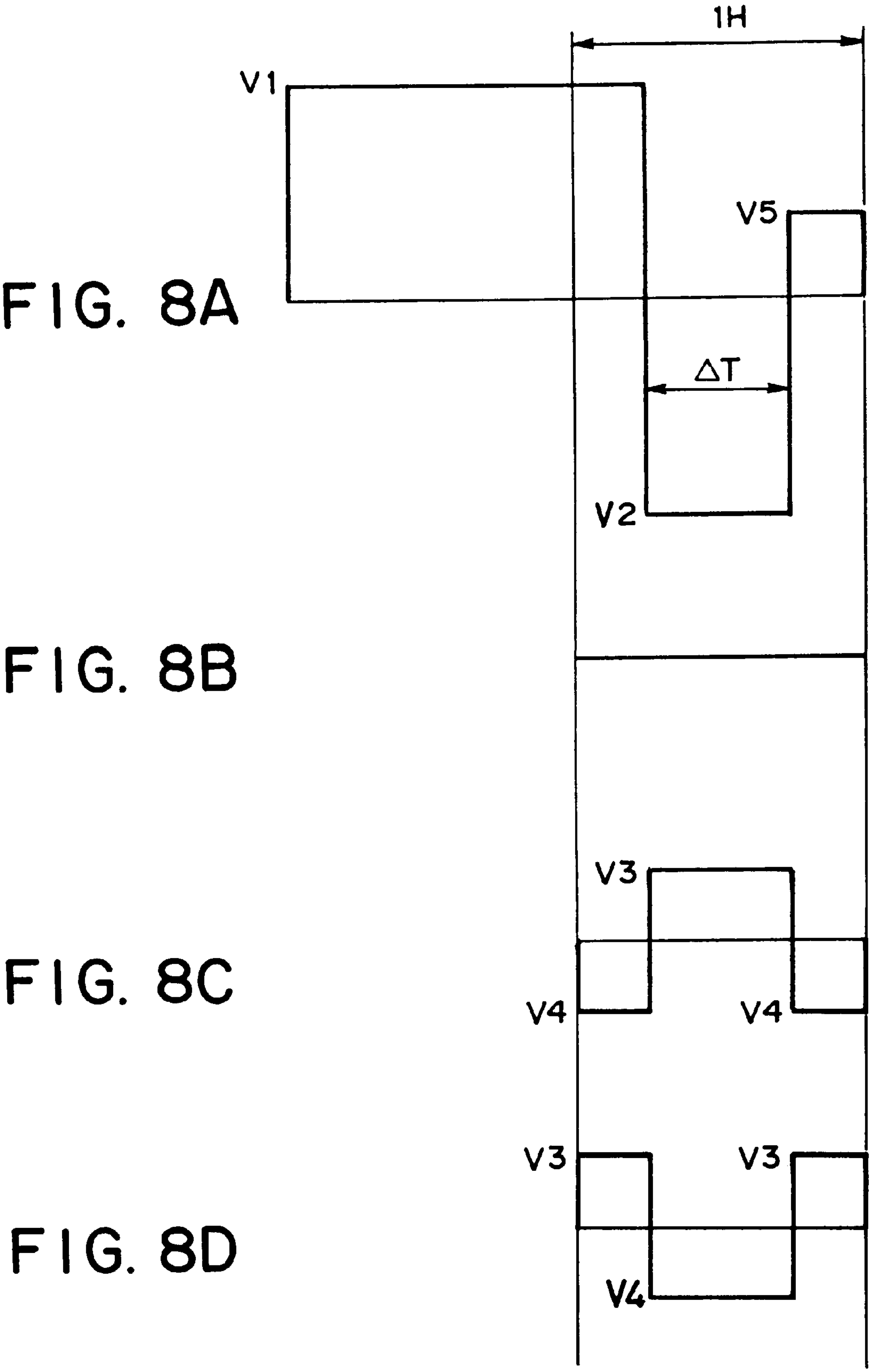
FIGS. 8A–8D are diagrams for showing a drive waveform W1 used in a display operation at a higher temperature by using the display apparatus shown in FIG. 7.
Figures 9A, 9B, 9C, 9D:
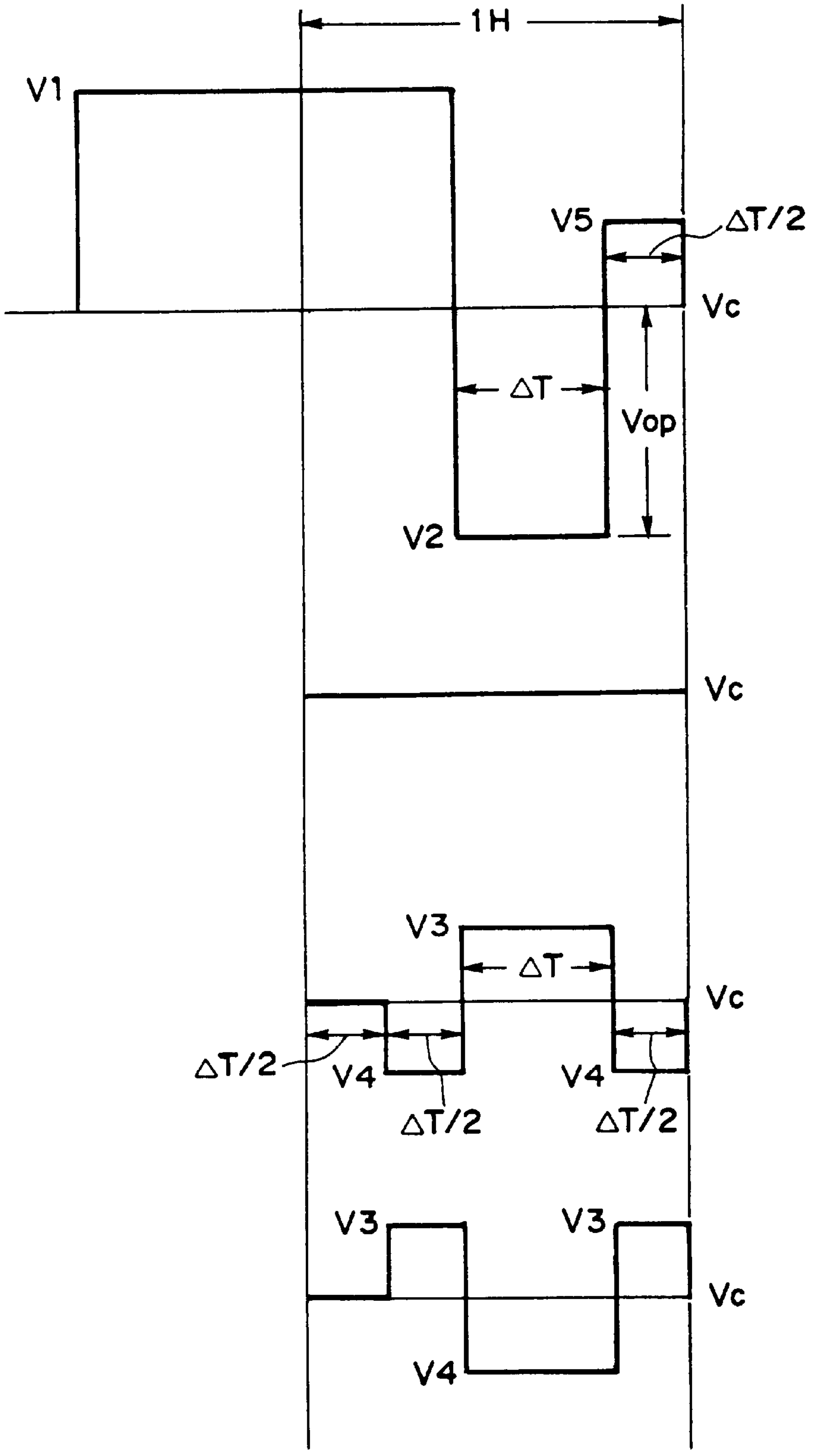
FIGS. 9A–9D are diagrams for showing a drive waveform W1 used in a display operation at a lower temperature by using the display apparatus shown in FIG. 7.

FIG. 7 is a block diagrams of a display apparatus according to an embodiment of the present invention. Referring to FIG. 7, the display apparatus includes a graphic controller 107, from which data are supplied via a drive control circuit 108 to be inputted to a scanning signal control circuit 104 and a data signal control circuit 106, where the data are converted into address data and display data, respectively. Based on the address data, a scanning signal application circuit 102 generates a scanning selection signal waveform as shown at FIG. 8A of FIG. 9A and a scanning non-selection signal waveform as shown at FIG. 8B or FIG. 9B. These scanning selection signal and scanning non-selection signal are applied to scanning electrodes constituting a display unit (panel) 101 including 1280×1024 pixels. On the other hand, based on the display data, a data signal application circuit 103 generates datalsignal waveforms as shown at FIG. 8C and 8D or FIG. 9C and 9D, which are applied to data electrodes also constituting the display unit 101.

Within a drive control circuit 105, a waveform (changeover) switch 105S is installed. The waveform switch 105S enters a sleep mode immediately after waveform switching and, after a prescribed period, is changed into an active mode. The temperature of the display unit 101 is detected by a temperature detection sensor 108 and inputted to a temperature detection circuit 109. Based on the temperature data, the drive control circuit 105 selects a drive waveform to be used and switch the waveform only when the waveform switch 105S is in the active mode. Then, the selected waveform data is sent via a scanning signal control circuit 104 and a data signal control circuit 106 to the scanning signal application circuit 102 and the data signal application circuit 103, respectively.

Figure 10:
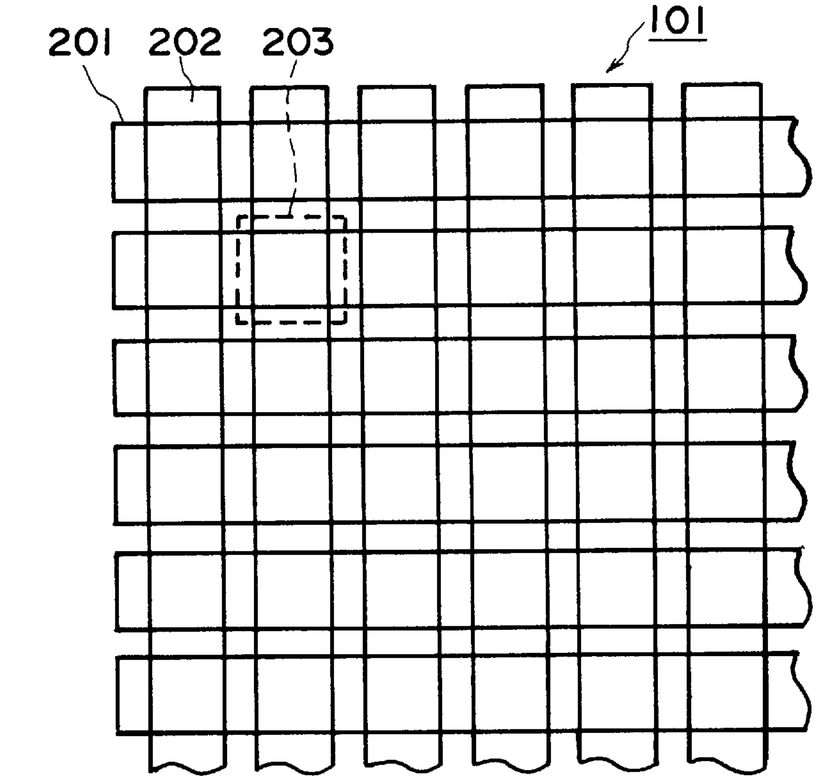
FIG. 10 is an enlarged view showing an electrode matrix of the display unit in the apparatus of FIG. 7.

FIG. 10 is an enlarged partial view of the display unit 101 in FIG. 7, showing an electrode matrix including scanning electrodes 201 and data electrodes 202 intersecting the scanning electrodes so as to form a pixel 203 as a display element at each intersection of the scanning electrodes 201 and the data electrodes 202.

Figure 11:
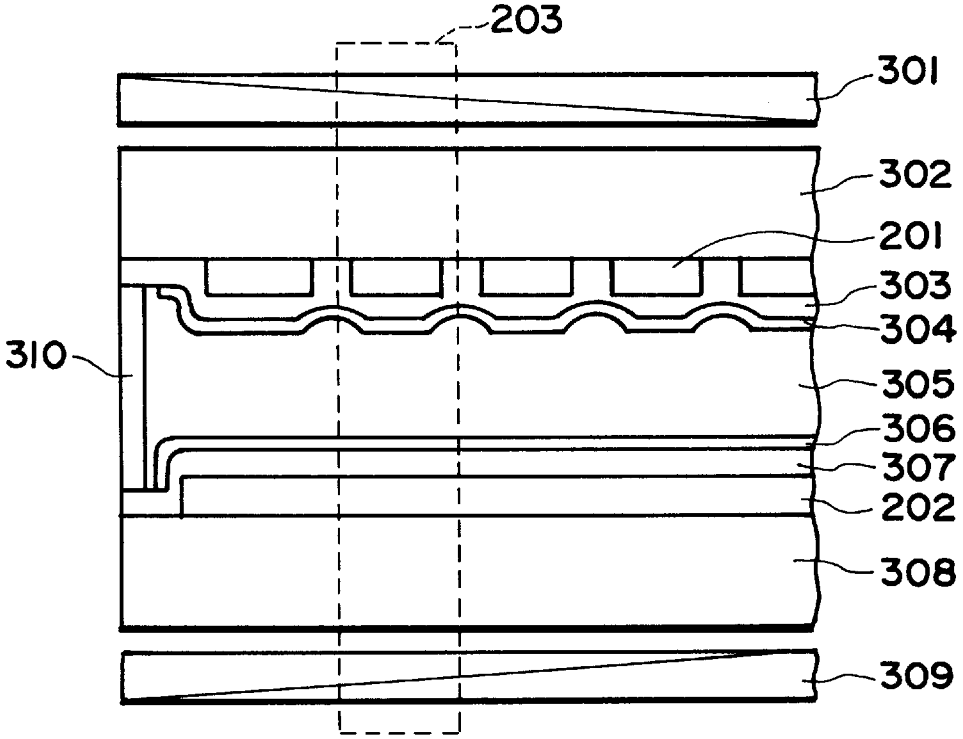
FIG. 11 is a schematic sectional view of the display unit in the apparatus of FIG. 7.

FIG. 11 is a partial sectional view of the display unit (liquid crystal device) 101. Referring to FIG. 11, the liquid crystal device includes a pair of polarizing means, i.e., an analyzer 301 and a polarizer 309 disposed in cross nicols so as to provide a bright display state corresponding to a liquid crystal state of U1 and a dark state corresponding to U2. Between the polarizing means 301 and 309, the liquid crystal device further includes glass substrates 302 and 308 which are respectively provided with stripe-form transparent electrodes 201 and 202 of, e.g., ITO (indium tin oxide), insulating films 303 and 307, and alignment films 304 and 306. A liquid crystal 305 of, e.g., a ferroelectric liquid crystal is disposed between the alignment films 304 and 306 and is hermetically sealed by a sealing member 310.

In a specific example, a ferroelectric liquid crystal showing physical properties in the following Table 1 was used in a chevron smectic layer structure.

TABLE 1

Ps = 6.1 nC/cm$^2$ (at 30° C.)
Tilt angle = 14.6 degrees (at 30° C.)
$\Delta\epsilon$ = −0.2 (at 30° C.)
Phase transition series (° C.)

$$\text{Iso.} \underset{91.8}{\overset{91.5}{\rightleftarrows}} \text{Ch.} \underset{85.7}{\overset{85.0}{\rightleftarrows}} \text{SmA} \xrightarrow{66.7} \text{SmC*} \underset{-12.5}{\overset{-16.7}{\rightleftarrows}} \text{Cryst.}$$

FIG. 8 shows a drive waveform W1 (including a set of drive signals) used in the apparatus of FIG. 7 at a higher temperature. Referring to FIG. 8A, a scanning selection signal comprising a selection pulse having a pulse width ΔT, a clearing pulse having a pulse width 2.5 ΔT immediately preceding the selection pulse and an auxiliary pulse having a pulse width ΔT/2 immediately subsequent to the selection pulse. At FIG. 8B is shown a scanning non-selection signal having a constant voltage level of 0 volt. At FIG. 8C is shown a data signal for "bright" display comprising a selection pulse having a pulse width ΔT and auxiliary pulses having a pulse width ΔT/2 placed before and after the selection pulse. At FIG. 9D is shown a data signal for "dark display" having a waveform obtained by polarity inversion of the data signal (FIG. 8C). In FIG. 8, 1H represents a one-horizontal scanning period and ΔT represents a selection period.

In a specific example, the display apparatus according to this embodiment was driven at 35° C. under the drive conditions of V1=14.3 volts, V2=−14.3 volts, V3=5.7 volts, V4=−5.7 volts, V5=6.4 volts and ΔT=32 μs, whereby a good display was performed over the entire display unit 101 at one-horizontal scanning period of 64 μs indicating a high-speed drive.

FIGS. 9A–9D show a drive waveform W2 used in the apparatus of FIG. 7 at a lower temperature. FIG. 9A shows, a scanning selection signal comprising a selection pulse having a pulse width ΔT, a clearing pulse having a pulse width 2.5 ΔT immediately preceding the selection pulse and an auxiliary pulse having a pulse width ΔT/2 immediately subsequent to the selection pulse. At FIG. 9B is shown a scanning non-selection signal having a constant voltage level of 0 volt. At FIG. 9C is shown a data signal for "bright" display comprising a selection pulse having a pulse width ΔT and auxiliary pulses having a pulse width ΔT/2 placed before and after the selection pulse, and a pause period having a duration of ΔT/2 disposed between the auxiliary pulses so as to prevent the continuation of the auxiliary pulses. At FIG. 9D is shown a data signal for "dark display" having a waveform obtained by polarity inversion of the data signal (FIG. 9C).

The display apparatus according to this embodiment was driven at 10° C. under the conditions of V1=14.3 volts, V2=−14.3 volts, V3=5.7 volts, V4=−5.7 volts, V5=6.4 volts and ΔT=80 μs, whereby a good display was performed over the entire display unit 101.

For comparison, the display apparatus was also driven by using the drive waveform W1 at a lower temperature (10° C.) and by using the drive waveform W2 at a higher temperature (35° C.). The results are summarized in the following Table 2.

TABLE 2

| | 10° C. | | 35° C. | |
|---|---|---|---|---|
| Waveform | Margin | Speed | Margin | Speed |
| W1 | (x) | (○) | ○ | ○ |
| W2 | ○ | Δ | (○) | (Δ) |

In this embodiment, the drive waveform W2 is selected at a lower temperature, and the drive waveform W1 is selected at a higher temperature. As a result of our further experiments by using the display apparatus, the following knowledges were obtained regarding the contrast accompanying the waveform switching.

(1) Under identical pulse height and pulse width, the switching from the drive waveform W1 to the drive waveform W2 resulted in a relative contrast increase of 1.5 times.

(2) A flicker was noticeable when a large contrast change was caused by the waveform switching. In this embodiment, a contrast change before and after the waveform switching of up to 1.3 times did not result in noticeable flicker.

(3) When the pulse height of the selection pulse in the drive waveform W2 was increased so as to provide closer contrasts, a good agreement of contrast was not achieved within the range of drive margin at a certain temperature.

In other words, a simple waveform switching between two drive waveforms does not always result in a contrast agreement at a good reproducibility, while a contrast change within a contrast ratio of 1.3 does not lead to a noticeable flicker.

In this embodiment, a display drive was performed by setting the reference temperature for waveform switching at 15° C. and the pulse height of the selection pulse was increased so as to suppress a contrast ratio before and after the waveform switching within a range of at most 1.2 with respect the contrast obtained by the drive waveform W1, whereby a good image quality was attained while accomplishing a high-speed display at a higher temperature.

As described above, according to First embodiment of the present invention, the drive waveform shape is changed according to a temperature change so that a pause period of ΔT/2 is inserted at a lower temperature to suppress the liquid crystal molecular fluctuation and ensure a drive margin, and the pause period is omitted at a higher temperature to realize a high-speed display, whereby flicker accompanying the waveform switching is also prevented.

In an actual operation of a display device, the environmental temperature change during the operation is relatively small, and the display device temperature after the start-up thereof is increased with time due to heat generation from the display device per se and the drive circuit therefor to be saturated at a certain temperature.

Accordingly, in another embodiment of the present invention, as briefly mentioned above, the drive waveform is changed only during a temperature raise and, thereafter, the drive waveform is retained regardless of some temperature change while adjusting the pulse width and the pulse height of the selected drive waveform to prevent the occurrence of the flicker. A specific embodiment thereof will now be described.

[Second embodiment]

A basic structure of the display apparatus according to this embodiment is identical to the one shown in FIG. 7 used in First embodiment.

In this embodiment, the waveform switch 105S in the drive control circuit is turned on or off depending on temperature data. More specifically, when a display operation using a first drive waveform is performed under a certain temperature condition and the detected temperature data indicates that the temperature is raised with time to exceed a prescribed reference temperature, the display operation using the first drive waveform is terminated and a display operation using a second drive waveform is started. On the other hand, when the display operation using the second drive waveform is performed, even when the temperature is lowered to below the reference temperature, the display operation by using the second drive waveform is continued.

Also in this embodiment, the structure of the display unit may be the same as shown in FIGS. 10 and 11 and the liquid crystal having physical properties shown in Table 1 may be used.

In a specific example, an entire display operation was performed by using a drive waveform W2 shown in FIGS. 9A–9D at an initial lower temperature below a reference temperature and a drive waveform W1 shown in FIGS. 8A–9D at a higher temperature.

The switch 105S was controlled by an AND circuit as a switching forbidding means so that it was turned on only in the course of temperature raising to switch the drive waveform to W1.

When the reference temperature was set to 15° C,. a prescribed drive margin was ensured and no flicker was observed even when the temperature was changed around the reference temperature.

[Third embodiment]

In the above Second embodiment, it is possible that, once the display device temperature exceeds the reference temperature, the display operation is continued by using only the drive waveform W1 and never using the drive waveform W2 even under any temperature condition.

In this embodiment, the display operation is designed so that, if the display operation using the drive waveform W1 is continued for a prescribed period at a lower temperature below the references temperature, the display operation using the drive waveform W2 is allowed.

As a result, the display operation using the drive waveform W1 is continued in case where a temperature change around the reference temperature frequently occurs.

On the other hand, if the temperature is left at a lower temperature for a long period exceeding prescribed period, the display operation using the drive waveform W2 can be resumed, so that the entire display operation can be performed smoothly even under a lower temperature condition.

In another embodiment of the present invention, in order to suppress the occurrence of flicker, the waveform switching is forbidden for a prescribed period after a waveform switching even if some temperature change occurs during the prescribed period, while the pulse width or pulse height is adjusted, as desired, corresponding to a temperature change to prevent the flicker.

[Fourth embodiment]

A basic structure of the display apparatus according to this embodiment is identical to the one shown in FIG. 7 used in First embodiment.

In this embodiment, the waveform switch 105S in the drive control circuit is turned on or off depending on temperature data. More specifically, when a display operation using a first drive waveform is performed under a certain temperature condition and the detected temperature data indicates that the temperature is raised with time to exceed a prescribed reference temperature for a period exceeding a prescribed period, the display operation using the first drive waveform is terminated and a display operation using a second drive waveform is started. On the other hand, when the display operation using the second drive waveform is continued below the reference temperature for a period exceeding a prescribed period, the display operation by using the first drive waveform is restored.

Also in this embodiment, the structure of the display unit may be the same as shown in FIGS. 10 and 11 and the liquid crystal having physical properties shown in Table 1 may be used.

In a specific example, an entire display operation was performed by using a drive waveform W1 shown in FIGS. 8A–8D at a higher temperature and a drive waveform W2 shown in FIGS. 9A–9D at a lower temperature below a reference temperature.

The switch 105S was controlled by an AND circuit as a switching forbidding means so that it was turned on and off when the display operation was continued for periods exceeding prescribed periods above and below the reference temperature, respectively.

As a result of our experiments by using the display apparatus of the above Fourth embodiment, the following knowledges were obtained regarding the waveform switching period.

(1) A short periodical waveform switching results in a flicker. In specific examples, a noticeable flicker occurred when the waveform switching was performed at a rate of once in a period of 2–10 sec.

(2) If the waveform switching forbidding period is too long, it becomes impossible to follow a temperature change to lose a drive margin. When a display operation using a single drive waveform was continued for a period exceeding 5 min. after a change in environmental temperature of the display device, a display failure occurred locally on the display unit 101 in some cases.

In other words, the display operation can become unsatisfactory in case of both too long and too short a waveform switching period, and a stable display period may be attained if the waveform switching period is set within a range of 5 sec. to 5 min.

In a specific example according to this embodiment, a display operation was performed by setting the reference temperature for waveform switching at 15° C. and the waveform switching period (i.e., a period in which the waveform switch 105S was placed in a sleep mode) was set to 30 sec., whereby a good image quality was obtained, and a high-speed display was performed at a higher temperature.

[Fifth embodiment]

Figure 12:
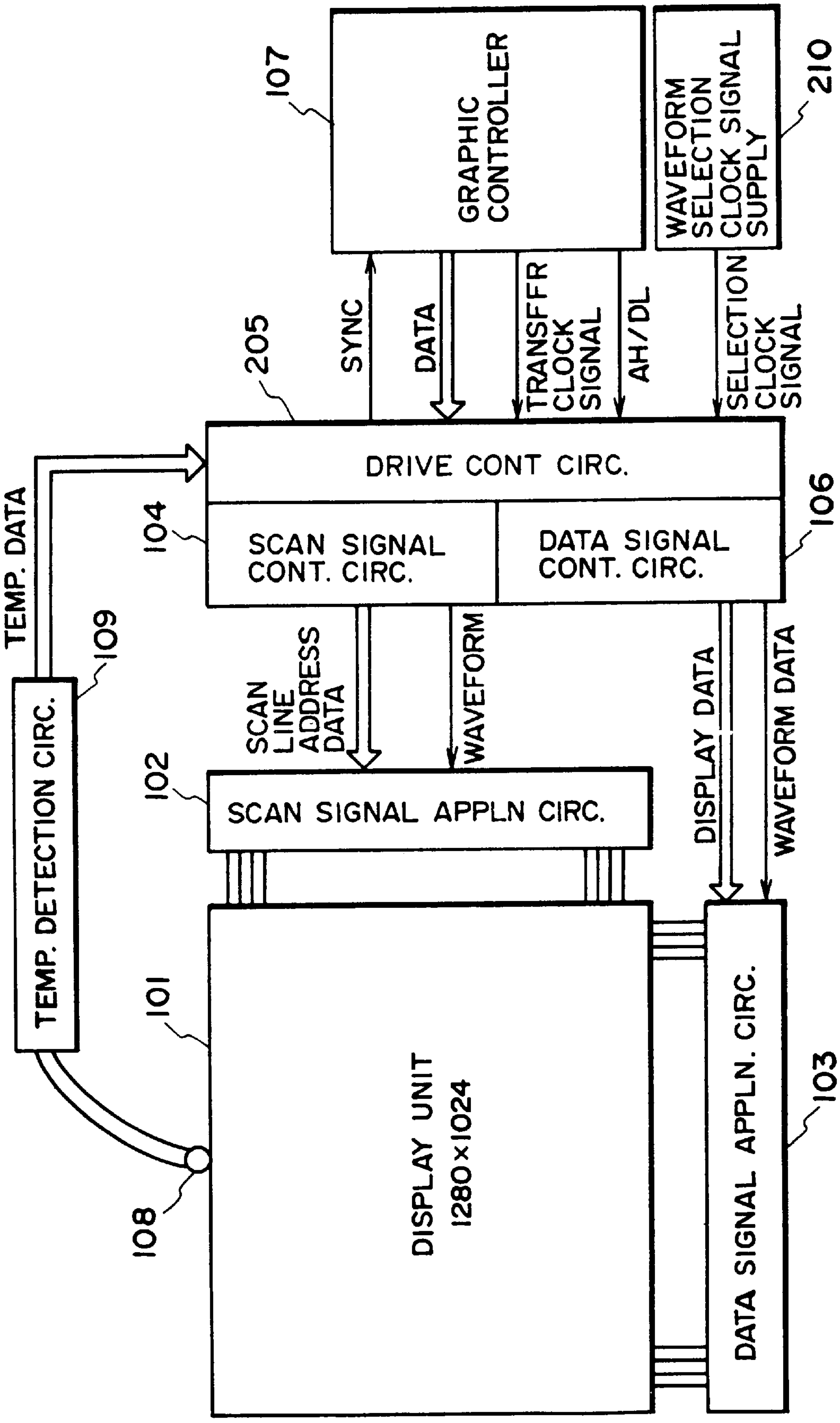
FIG. 12 is a block diagrams of a display apparatus according to another embodiment of the invention.

FIG. 12 is a block diagrams of a display apparatus according to another embodiment of the present invention. Referring to FIG. 12, the display apparatus includes a graphic controller 107, from which data are supplied via a drive control circuit 205 to be inputted to a scanning signal control circuit 104 and a data signal control circuit 106, where the data are converted into address data and display data, respectively. Based on the address data, a scanning signal application circuit 102 generates a scanning selection signal waveform as shown at FIG. 8A or FIG. 9A and a scanning non-selection signal waveform as shown at FIG. 8B or FIG. 9B. These scanning selection signal and scanning non-selection signal are applied to scanning electrodes constituting a display unit (panel) 101 including 1280×104 pixels. On the other hand, based on the display data, a data signal application circuit 103 generates data signal waveforms as shown at FIGS. 8C and 8D or FIGS. 9C and 9D which are applied to data electrodes also constituting the display unit 101.

The display apparatus shown in FIG. 12 further includes a waveform selection clock signal supply 210, from which a selection clock signal is supplied at each prescribed period. The temperature of the display unit 101 is detected by a temperature detection sensor 108 and inputted to a temperature detection circuit 109. Based on the temperature data, a drive control circuit 205 selects a drive waveform to be used at a timing designated by a selection clock signal. Then, the selected waveform data is sent via the scanning selection signal control circuit 104 and the data signal control circuit 106 to the scanning signal application circuit 102 and the drive signal application circuit 103, respectively.

According to this embodiment, it is not necessary to detect a change in waveform so that the display apparatus can be realized by adding an external clock signal supply to a conventional display apparatus.

In a specific example, the reference temperature for waveform switching was set to 15° C., and the waveform selection signal was designed to occur at a period set within the range of 5 sec. to 5 min. to effect a display operation, whereby flicker-free good display was performed.

As described above, according to Third to Fifth embodiments of the present invention, different shapes of drive waveforms are used so that a pause period of ΔT/2 is inserted in a lower temperature drive to suppress the liquid crystal molecular fluctuation and ensure a drive margin, and the pause period is omitted in a higher temperature drive to realize a high speed display. Further, by performing the waveform switching after confirming that the period of a temperature below a reference temperature exceeds a prescribed period, flicker accompanying the waveform switching can be prevented.

[Sixth embodiment]

The display operation according to First and Third to Fifth embodiments was repeated except that the display operation at 38° C. was performed by using the drive waveform W1 under the conditions of V1=14.2 volts, V2=−14.2 volts, V3=5.6 volts, V4=−5.6 volts, V5=6.3 volts, ΔT=31 μs, whereby good and high-speed display was given over the entire display unit 101.

On the other hand, the display operation at 8° C. was performed by using the drive waveform W2 under the conditions of V1=14.4 volts, V2=−14.4 volts, V3=4.8 volts, V5=6.5 volts and ΔT=18.1 μs, whereby good display was given over the entire display unit 101.

In this embodiment, the reference temperature for waveform switching was set to 16° C.

As described above, according to the present invention, the drive waveform shape is changed according to a temperature change so that a pause period of ΔT/2 is inserted at a lower temperature to suppress the liquid crystal molecular fluctuation and ensure a drive margin, and the pause period is omitted at a higher temperature to realize a high-speed display, whereby flicker accompanying the waveform switching is also prevented.

What is claimed is:

1. A display apparatus, comprising:

a display device having a multiplicity of pixels, temperature detection means for detecting a temperature of the display device, and control means for switching a drive waveform for driving the display device depending on temperature data from the temperature detection means so as to apply to the display device a first waveform having a pause period of applying a voltage of zero to the pixels at a temperature lower than a prescribed temperature and apply a second waveform not having the pa use period at a temperature not lower than the prescribed temperature, the control means forbidding the switching of the drive waveform within a prescribed period after once effecting the waveform switching.

2. A display apparatus according to claim 1, wherein said display device comprises a smectic liquid crystal device.

3. A display apparatus according to claim 1, wherein said display device comprises a liquid crystal device including a liquid crystal having a chevron-shaped smectic layer structure.

4. A display apparatus according to claim 1, wherein said control means forbids the waveform switching depending on a manner of temperature change and/or a time after a waveform switching.

5. A display apparatus according to claim 1, wherein said control means changes an effective value of a drive voltage so as to suppress a contrast change accompanying the waveform switching.

6. A display apparatus, comprising;

a display device having a multiplicity of pixels, a temperature detection circuit for detecting a temperature of the display device, and a drive control circuit for controlling drive conditions for the display device depending on temperature data from the temperature detection circuit;

said control circuit having a function of switching a drive waveform for driving the display device, so as to apply to the display device a first waveform having a pause period of applying a voltage of zero to the pixels at a temperature lower than a prescribed temperature and apply a second waveform not having the pause period at a temperature not lower than the prescribed temperature, and also a function of changing an effective value of a selection pulse in the drive waveform at the time of the waveform switching.

7. A display apparatus according to claim 6, wherein said drive waveform includes:

a scanning selection signal applied to scanning electrodes, said scanning selection signal not depending on temperature but comprising a scanning selection pulse, a clearing pulse immediately preceding the scanning selection pulse and scanning auxiliary pulse immediately subsequent to the scanning selection pulse, and a data signal applied to data electrodes selected from (a) the second waveform including a first data selection pulse and first data auxiliary pulses placed before and after the first data selection pulse, and (b) the first waveform including a second data selection pulse, second data auxiliary pulses placed before and after the second data selection pulse, and the pause period being placed between second data auxiliary pulses of a successive pair of the first waveforms so as to prevent a succession of the second data auxiliary pulses;

said drive control circuit increasing the effective value of the second data selection pulse in the first waveform in relation to the effective value of the first data selection pulse in the second waveform before or after the waveform switching.

8. A display apparatus according to claim 7, wherein said drive control circuit increases the pulse height of the second data selection pulse in the first waveform in relation to the pulse height of the first data selection pulse in the second waveform before or after the waveform switching.

9. A display apparatus according to claim 6, wherein said display device is a chiral smectic liquid crystal device.

10. A display apparatus according to claim 6, wherein said display device is a ferroelectric liquid crystal device.

11. An display apparatus, comprising:

a display device having a multiplicity of pixels, a temperature detection circuit for detecting a temperature of the display device, and a drive control circuit for controlling drive conditions including a drive waveform for the display device depending on temperature data from the temperature detection circuit so as to apply to the display device a first waveform having a pause period of applying a voltage of zero to the pixels at a temperature lower than a prescribed temperature and apply a second waveform not having the pause period at a temperature not lower than the prescribed temperature;

said drive control circuit changing the drive waveform for driving the display device only when the temperature is increased to exceed said prescribed temperature.

12. A display apparatus according to claim 11, wherein said drive control circuit forbids waveform switching when the temperature is lowered to below the prescribed temperature.

13. A display apparatus according to claim 11, wherein said display device is a liquid crystal device comprising a pair of substrates having a group of scanning electrodes and a group of data electrodes, respectively, thereon, and a chiral smectic liquid crystal disposed between the pair of substrates.

14. A display apparatus according to claim 11, wherein said display device is a liquid crystal device comprising a pair of substrates having a group of scanning electrodes and a group of data electrodes, respectively, thereon, and a ferroelectric liquid crystal disposed between the pair of substrates.

15. A display apparatus according to claim 11, wherein said drive waveform includes:

a scanning selection signal applied to scanning electrodes, said scanning selection signal not depending on temperature but comprising a scanning selection pulse, a clearing pulse immediately preceding the scanning selection pulse and a scanning auxiliary pulse immediately subsequent to the scanning selection pulse, and a data signal applied to data electrodes selected from (a) the second waveform including a first data selection pulse and first data auxiliary pulses placed before and after the first data selection pulse, and (b) the first waveform including a second data selection pulse, second data auxiliary pulses placed before and after the second data selection pulse, and the pause period being placed between second data auxiliary pulses of a successive pair of the first waveforms so as to prevent a succession of the second data auxiliary pulses.

16. A display apparatus, comprising:

a display device having a multiplicity of pixels, a temperature detection circuit for detecting a temperature of the display device, and a drive control circuit for controlling drive conditions for the display device depending on temperature data from the temperature detection circuit;

said drive control circuit having a function of switching a drive waveform for driving the display device depending on the temperature data so as to apply to the display device a first waveform having a pause period of applying a voltage of zero to the pixels at a temperature lower than a prescribed temperature and apply a second waveform not having the pause period at a temperature not lower than the prescribed temperature, and also a function of forbidding further waveform switching for a prescribed period after a waveform switching.

17. A display apparatus according to claim 16, wherein said prescribed period is set within a range of 10 sec. to 5 min.

18. A display apparatus according to claim 16, wherein said drive waveform includes:

a scanning selection signal applied to scanning electrodes, said scanning selection signal not depending on temperature but comprising a scanning selection pulse, a clearing pulse immediately preceding the scanning selection pulse and a scanning auxiliary pulse immediately subsequent to the scanning selection pulse, and a data signal applied to data electrodes selected from (a) the second waveform including a first data selection pulse and first data auxiliary pulses placed before and after the first data selection pulse and (b) the first waveform including a second data selection pulse, second data auxiliary pulses placed before and after the second data selection pulse, and the pause period being placed between second data auxiliary pulses of a successive pair of the first waveforms so as to prevent a succession of the second data auxiliary pulses.

19. A display apparatus, comprising:

a display device comprising an electrode matrix comprising scanning electrodes and data electrodes, and a ferroelectric liquid crystal dispose so as to form a pixel at each intersection of the scanning electrodes and the data electrodes, and a drive control circuit for changing drive waveforms applied to the scanning electrodes and the data electrodes so as to apply to the display device a first waveform having a pause period of applying a voltage of zero to the pixels at a temperature lower than a prescribed temperature and apply a second waveform not having the pause period at a temperature not lower than the prescribed temperature, said drive control circuit continually applying identical drive waveforms for a prescribed period after a waveform change.

* * * * *

UNITED STATES PATENT AND TRADEMARK OFFICE

CERTIFICATE OF CORRECTION

PATENT NO. : 6,075,511

DATED : June 13, 2000

INVENTOR(S) : MANABU IWASAKI ET AL.

It is certified that error appears in the above-identified patent and that said Letters Patent is hereby corrected as shown below:

ON THE COVER PAGE:

Under column [56], References Cited, in Foreign Patent Documents, insert --W089/0502 6/1/89 PCT
0 604 930 7/6/94 Europe--; and In *Attorney, Agent, or Firm* "Fitzpatrick,Cella," should read --Fitzpatrick, Cella,--.

In column [57], ABSTRACT,
Line 3, "include" should read --includes--;
Line 9, "preferable" should read --preferably--;
Line 10, "in" should be deleted; and
Line 11, "then" should read --than--.

COLUMN 6

Line 49, "datalsignal" should read --data signal--.

COLUMN 12

Line 14, "pa use" should read --pause--; and
Line 32, "comprising;" should read --comprising:--.

UNITED STATES PATENT AND TRADEMARK OFFICE
CERTIFICATE OF CORRECTION

PATENT NO. : 6,075,511

DATED : June 13, 2000

INVENTOR(S) : MANABU IWASAKI ET AL.

It is certified that error appears in the above-identified patent and that said Letters Patent is hereby corrected as shown below:

COLUMN 13

Line 15, "An" should read --A--.

COLUMN 14

Line 47, "dispose" should read --disposed--.

Signed and Sealed this

Twenty-second Day of May, 2001

*Attest:*

Nicholas P. Godici

NICHOLAS P. GODICI

*Attesting Officer* *Acting Director of the United States Patent and Trademark Office*